J. E. ROBBINS.
HAY BALER.
APPLICATION FILED JUNE 2, 1917.
1,249,505.
Patented Dec. 11, 1917.
4 SHEETS—SHEET 4.
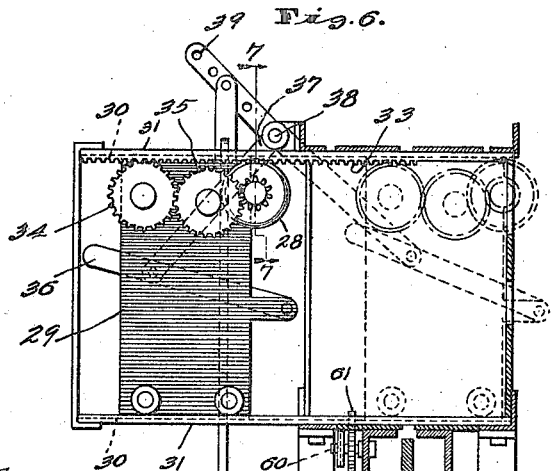
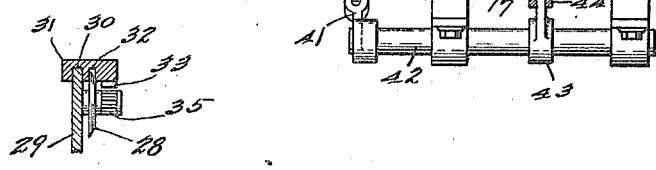
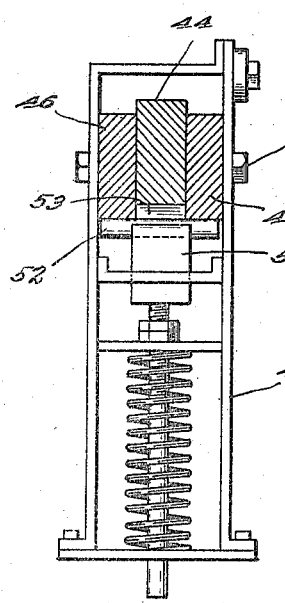
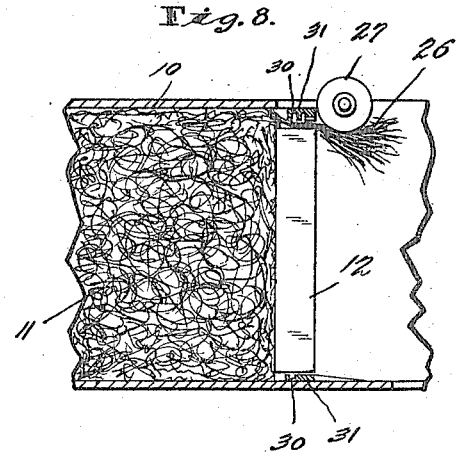
Witness
Frank A. Salele
Inventor
John E. Robbins,
By
Hood & Schley
Attorneys

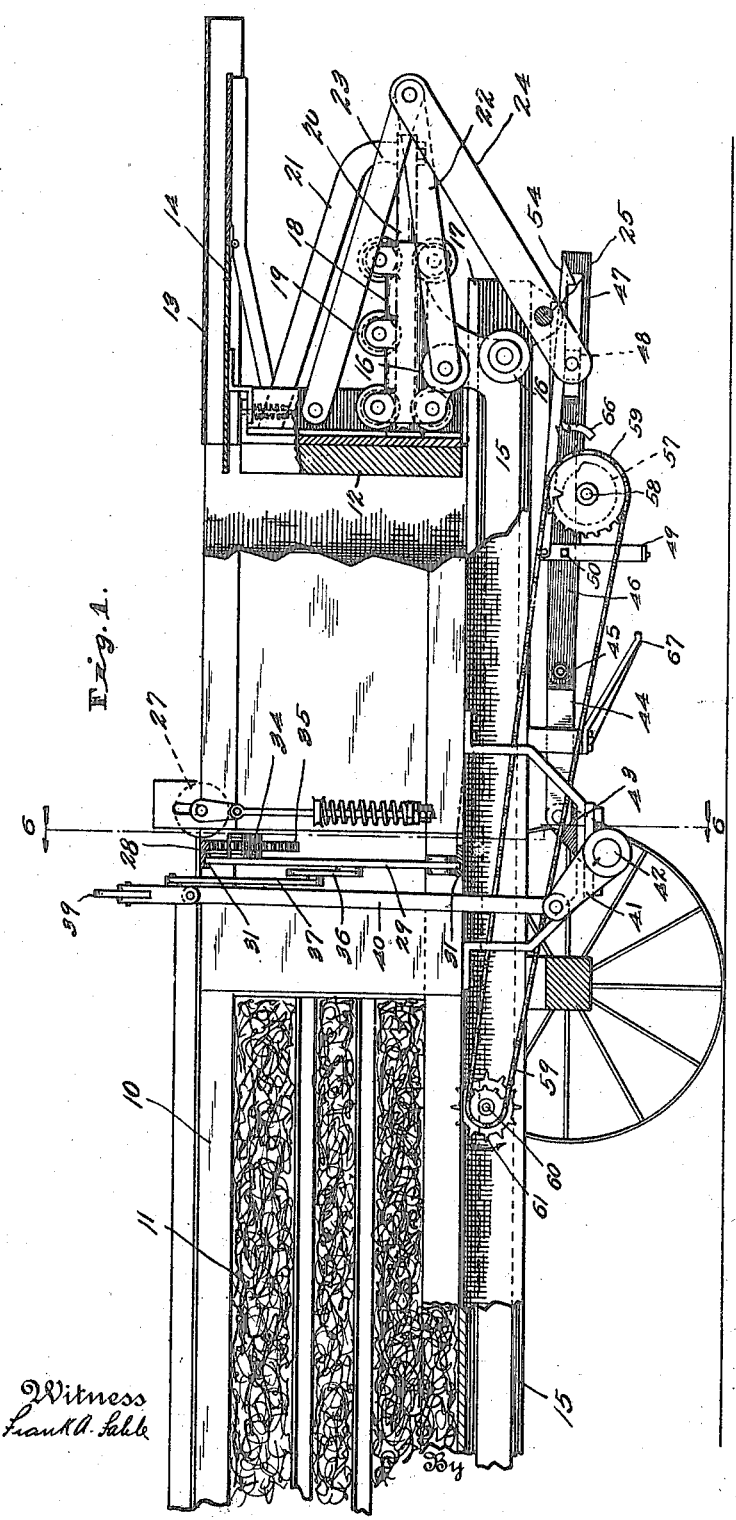

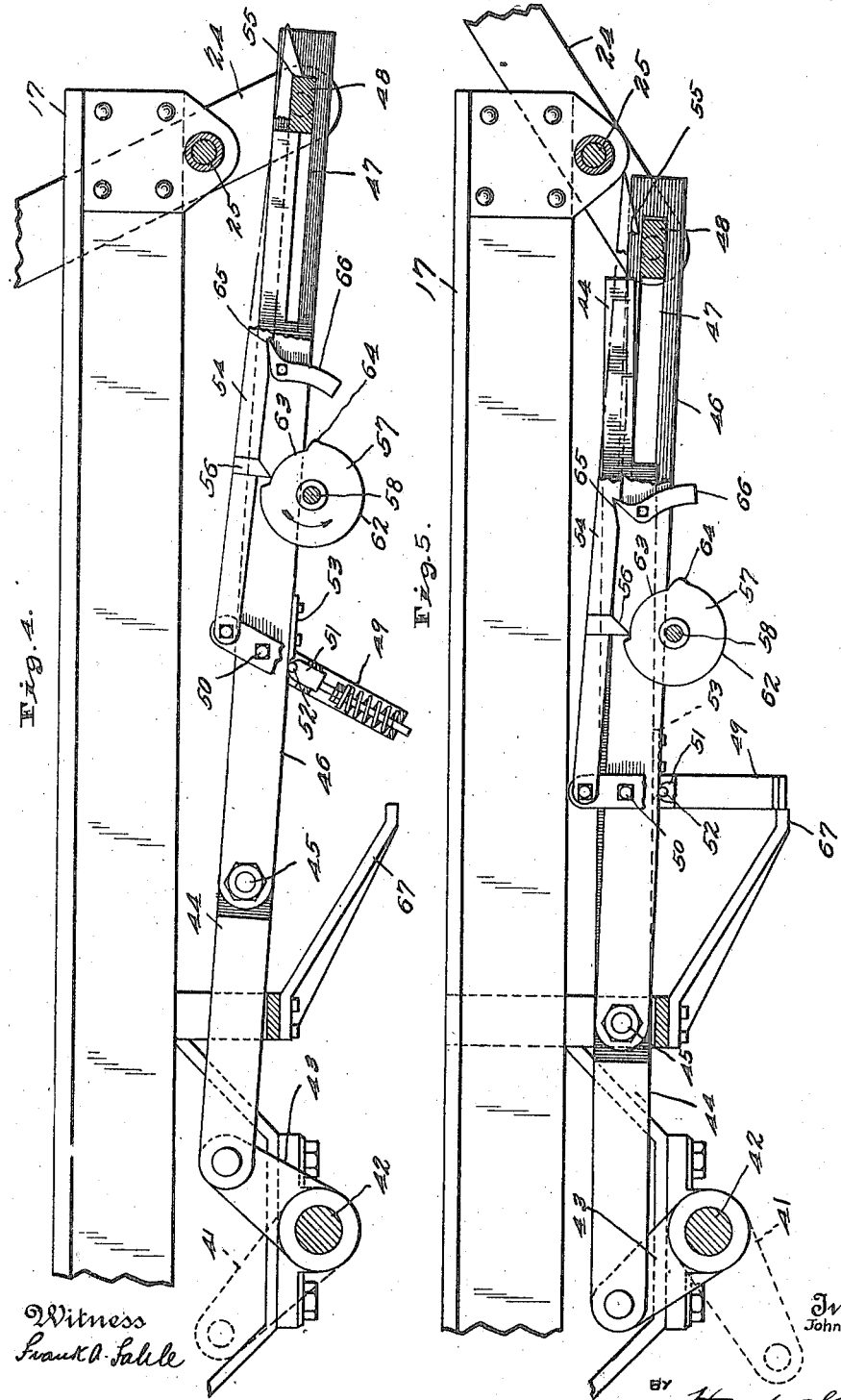

UNITED STATES PATENT OFFICE.

JOHN E. ROBBINS, OF GREENSBURG, INDIANA.

HAY-BALER.

1,249,505.

Specification of Letters Patent.

Patented Dec. 11, 1917.

Application filed June 2, 1917. Serial No. 172,376.

*To all whom it may concern:*

Be it known that I, JOHN E. ROBBINS, a citizen of the United States, residing at Greensburg, in the county of Decatur and State of Indiana, have invented a new and useful Hay-Baler, of which the following is a specification.

In the baling of hay, difficulty is frequently encountered in the separation of one bale from the next in the baler, because of the overlapping of the hay between such bales past the dividing line. This overlapping occurs in the ordinary hay baler at the upper edge, because the hay is usually fed in from the top.

It is the object of my present invention to separate adjacent bales in the baler by cutting the overlapping hay.

The accompanying drawings illustrate my invention. Figure 1 is a fragmentary side elevation, in partial section, of a hay baler embodying my invention; Fig. 2 is a section on the line 2—2 of Fig. 3, showing part of the operating mechanism for the baler plunger and my dividing cutter, with the cutter-operating mechanism in non-operating condition; Fig. 3 is a plan of the mechanism shown in Fig. 2, with part of the supporting frame in section; Figs. 4 and 5 are views similar to Fig. 2, but with the cutter-operating mechanism shown in the positions it would occupy at the beginning and end respectively of its stroke to the left; Fig. 6 is a section on the line 6—6 of Fig. 1; Fig. 7 is a section on the line 7—7 of Fig. 6; Fig. 8 is a fragmentary longitudinal section through the hay baler, showing how the hay tends to overlap from one bale into position to be caught in the next; and Fig. 9 is a section on the line 9—9 of Fig. 2.

The hay baler proper may be of standard form, comprising a compressing frame 10, usually formed as an open frame of angle irons, into which the hay 11 is compressed by the horizontal reciprocations of a compressing plunger 12, slidable lengthwise of the hay baler in any suitable manner. The hay to be baled is thrown on a table formed of a fixed plate 13 carried by the frame 10 and a movable plate 14 carried by the plunger 12 and reciprocable with it so that as the plunger slides to the right the hay which was on the plate 14 is scraped therefrom and drops into the space at the left of the plunger, ready to be compressed on the next movement of the plunger to the left.

As shown, the reciprocations of the plunger 12 are obtained by a reciprocating operating rod 15, moved alternately to the right and the left (Fig. 1) in any suitable manner by mechanism (not shown) at the left hand end thereof. At its right hand end, the rod 15 is provided with guide rollers 16 which travel on the upper and lower surfaces of flanges of the main longitudinal angle irons 17 of the frame 10, and also with a guide frame 18 carrying rollers 19 which bear against a guide rod 20 projecting to the right from the plunger 12 so as to guide the movements of the latter, the outer end of the guide rod 20 being connected to the plunger by a suitable strut 21 for rigidity. The right hand end of the rod 15 is also connected by a link 22 to the knee of a toggle formed by links 23 and 24 the ends of which are respectively connected to the plunger 12 and to a pivot pin 25 carried by the right hand ends of the main frame angle irons 17. By this toggle connection, the reciprocations of the rod 15 produce reciprocations of the plunger 12, to compress the hay within the frame 10.

When the hay is compressed within the frame 10, there are always wisps of hay which project rearward from the end of the bale and will be caught by the hay which is to form the next following bale, thereby joining the two bales past their plane of separation. This is indicated in Fig. 8, where the wisp 26 of hay from the rear end of the bale just being completed by the movement of the plunger 12 to the left projects past such plunger and under the tucker roller 27 into position to be caught by the next batch of hay. To cut off these overlapping wisps of hay, which always occur at the top because the hay is fed in from the top, I provide a rotating cutting knife 28 which travels across the line of movement of the plunger 12 periodically (see Figs. 1, 6, and 7). This cutter knife is carried in suitable bearings in a transversely sliding frame 29, which slides in grooves 30 in upper and lower guide members 31 mounted in the frame 10. The cutter knife 28 preferably projects upward into a similar guiding groove 32 in the upper guide member 31. In order to give the cutter 28 a rotary movement, the upper guide member 31 is provided with rack teeth 33, which mesh with a gear 34 connected by suitable speed-multiplying gearing 35 to the cutter wheel 28, so that as the frame 29 moves the cutter wheel 28 is rotated, to cut off the rearwardly projecting wisps 26.

In order to move the frame 29 at the proper times, it is provided with an operating mechanism which is operated automatically when the desired amount of hay has been fed into the frame 10. To accomplish this, the frame 29 is connected by a link 36 to an arm 37 on a shaft 38 transverse to the guide members 31, on which shaft 38 there is an arm 39 connected by a link 40 provided with suitable joints to an arm 41 on the shaft 42 transverse to the shaft 38 and below the frame 10. The shaft 42 also carries an arm 43. To this arm 43 is pivoted a long finger 44, which at an intermediate point 45 of its length has pivotally mounted thereon a long U-shaped member 46, between the legs of which the finger 44 lies. The member 46 at its free end, opposite the pivot pin 45, is provided with slots 47 in which is slidably mounted a block 48 carried by a downward projection from the link 24. Normally, the block 48 slides along the slots 47, and is overlaid by the free end of the finger 44, as is clear from Fig. 2; but under certain conditions the finger 44 is lowered from the position shown in Fig. 2 to the position shown in Fig. 4, so that it locks the block 48 at the right hand end of the slots 47, and under such condition the oscillation of the link 24 in the movement of the plunger produces a reciprocation of the finger 44 and member 46 as a unit to oscillate the shafts 42 and 38 so as to produce a reciprocation of the cutter wheel 28 across the bale to cut off the wisps 26. After one complete reciprocation of these parts when the finger 44 locks itself and the member 46 to the block 48, the parts are again unlocked to permit the oscillation of the link 24 during successive reciprocations of the plunger, without moving the cutter wheel 28.

In order to produce this locking and unlocking at the proper times, the U-shaped member 46 has a spring frame 49 pivoted thereto on a pivot pin 50, and in the lower part of this spring frame is mounted an upwardly spring-pressed plunger 51 provided at its upper end with a cross pin 52 cooperating with the under faces of the U-shaped member 46, the finger 44, and a cam block 53 mounted at a definite point on the latter. When the pin 52 engages the cam block 53 as shown in Fig. 2 it lifts the finger 44 clear of the block 48, but when the spring frame is swung so that the pin 52 is disengaged from the cam 53 as shown in Fig. 4, the finger 44 is allowed to drop into position to interlock with the block 48. To produce this swinging of the spring frame 49, there is pivoted to the upper end of such spring frame a latch finger 54 which at its free or right hand end is provided with a latch shoulder 55 which may be engaged and moved to the right by the block 48 when such latch finger is lowered, but is cleared by such block 48 when the latch finger is raised. To raise and lower the latch finger, it is provided at an intermediate point with a downwardly projecting prong 56 which rides on a rotary cam 57 on a shaft 58 connected through a suitable chain and sprockets 59 to a shaft 60 carrying the toothed wheel 61 the teeth of which project into the compressed hay 11 so that as the hay is fed into the baler and compressed the wheel 61 is rotated by the sliding of the compressed hay to the left. Thus the cam 57 is rotated as the hay is compressed, and makes one complete rotation for a predetermined length of the compressed hay in the frame 10, such length being determined by the gearing ratio of the chain and sprockets 59, which gearing ratio may be changed as desired. For the greater part of its circumference the cam 57 is a circular arc 62, of such radius that the prong 56 is held in the position shown in Fig. 2 so that the shoulder 55 clears the block 48. The cam also has a lower and shorter arc-shaped portion 63, which permits the latch finger 54 to drop to the position shown in Fig. 4, so that the shoulder 55 may be engaged by the block 48. In addition, at the clockwise end of the portion 63, the cam 57 is provided with a projection 64, which lifts the latch finger 54 higher than the position shown in Fig. 2, so as to separate a notch 65 formed in such cam finger from a pivot dog 66 with which such notch drops into engagement when the latch finger 54 is moved to the right.

By this arrangement, the plunger 12 reciprocates without producing any movement of the cutter knife so long as the prong 56 remains on the higher arc-shaped segment 62 of the cam 57, as shown in Fig. 2, as the block 48 then clears both the free end of the finger 44 and the latch shoulder 55. When enough hay 11 has been compressed in the frame 10 to rotate the toothed wheel 61 sufficiently far to cause the lower segment 63 of the cam 57 to come beneath the prong 56, as shown in Fig. 4, the latch finger 54 drops to the position shown in Fig. 4, and thereupon on the next movement of the plunger 12 to the left or the block 48 to the right, such block 48 engages the shoulder 55 and draws the latch finger 54 to the right to tilt the spring frame 49 from the position shown in Fig. 2 to the position shown in Fig. 4, thereby moving the cross pin 52 off the cam block 53 and permitting the finger 44 to drop from the position shown in Fig. 2 to the position shown in Fig. 4. This dropping occurs as the block 48 reaches its right hand limit of movement in the slots 47, and by such dropping the end of such finger is engaged by the side of the block 48 so that the block 48 may move the finger 44 and U-shaped member 46 with it in its next reciprocation. This it does. As the block 48 moves to the left it carries the finger 44 and U-shaped member 46 with it, thereby turning the shafts 42 and 38 to cause the cutter wheel 28 to move across the rear edge of the compressed hay and cut off the rearwardly projecting wisps 26. The movement of the cutter wheel from the full-line position to the dotted line position (shown in Fig. 6) occurs as the block 48 moves to the left (Figs. 2, 4, and 5). As the finger 44 and U-shaped member 46 are thus moved to the left with the block 48, the lower end of the spring frame 49 engages a fixed stop 67, which returns the spring frame to its normal position relative to the finger 44 and member 46, thereby moving the cross pin 52 again beneath the cam block 53 and raising the finger 44 so that its free end again clears the block 48. In addition, the latch finger 54 is drawn to the left, and in its movement the notch 65 engaging the dog 66 carries the latter from the position shown in Fig. 4 to the position shown in Fig. 5, thereby lifting the free end of the latch finger 54 so that the shoulder 55 also clears the block 48. As the block 48 then moves to the right (Figs. 2, 4, and 5), it carries the finger 44 and member 46 with it and returns the cutter wheel 28 from the dotted-line to the full-line position (Fig. 6). Some time after the latch finger 54 and finger 44 have been thus raised, the projection 64 engages the prong 56 to momentarily lift the latch finger 54 farther and cause the disengagement of the dog 66 from the notch 65, the dog swinging by gravity back to its normal position shown in Fig. 2. The flexibility of the chain 59 permits the relative movement between the two sprockets which it connects.

After the movements which have been described are finished, the continued reciprocations of the operating rod 15 operate the plunger without moving the cutter wheel 28, until another predetermined amount of hay has been compressed, whereupon the cutter wheel is actuated in the manner just described to produce another separation between bales.

I claim as my invention:

1. A hay baler, comprising a compression frame, a reciprocating plunger for compressing hay within said frame, a cutter movable transversely to the reciprocations of said plunger to separate one bale from the next, and means for controlling the movements of said cutter by the movements of the compressed hay.

2. A hay baler, comprising a compression frame, a reciprocating plunger for compressing hay within said frame, and a cutter movable transversely to the reciprocations of said plunger to separate one bale from the next.

3. A hay baler, comprising a compression frame, a reciprocating plunger for compressing hay within said frame, a cutter movable transversely to the reciprocations of said plunger to separate one bale from the next, means for operating said plunger, and means for intermittently operating said cutter by the operations of the plunger-operating mechanism.

4. A hay baler, comprising a compression frame, a reciprocating plunger for compressing hay within said frame, a cutter movable transversely to the reciprocations of said plunger to separate one bale from the next, means for operating said plunger, means for intermittently operating said cutter by the operations of the plunger-operating mechanism, and means controlled by the movements of the hay through the compression frame for producing operation of the cutter at predetermined points.

5. A hay baler, comprising a compression frame, a reciprocating plunger for compressing hay within said frame, a transversely movable rotatable cutter which by its movement severs rearwardly projecting wisps of hay from a completed bale, and means for producing rotation of such cutter by its movement transverse to the reciprocations of the plunger.

6. A hay baler, comprising a compression frame, a reciprocating plunger for compressing hay within said frame, and a transversely movable rotatable cutter which by its movement severs rearwardly projecting wisps of hay from a completed bale.

7. A hay baler, comprising a compression frame, a reciprocating plunger for compressing hay within said frame, a transversely movable rotatable cutter which by its movement severs rearwardly projecting wisps of hay from a completed bale, means for producing rotation of such cutter by its movement transverse to the reciprocations of the plunger, and means controlled by the movement of the compressed hay for producing transverse movement of such cutter.

8. A hay baler, comprising a compression frame, a reciprocating plunger for compressing hay within said frame, a transversely movable rotatable cutter which by its movement severs rearwardly projecting wisps of hay from a completed bale, and means controlled by the movement of the compressed hay for producing transverse movement of such cutter.

9. A hay baler, comprising a compression frame, a reciprocating plunger for compressing hay within said frame, a transversely movable rotatable cutter which by its movement severs rearwardly projecting wisps of hay from a completed bale, mechanism for reciprocating said plunger, and mechanism intermittently operated by said plunger-operating mechanism for producing transverse movements of said rotatable cutter.

10. A hay baler, comprising a compression frame, a reciprocating plunger for compressing hay within said frame, a transversely movable rotatable cutter which by its movement severs rearwardly projecting wisps of hay from a completed bale, mechanism for reciprocating said plunger, and mechanism intermittently operated by said plunger-operating mechanism for producing transverse movements of said rotatable cutter.

11. A hay baler, comprising a compression frame, a reciprocating plunger for compressing hay within said frame, a transversely movable rotatable cutter which by its movement severs rearwardly projecting wisps of hay from a completed bale, mechanism for reciprocating said plunger, mechanism intermittently operated by said plunger-operating mechanism for producing transverse movements of said rotatable cutter, and means controlled by the movement of the compressed hay in the compression frame for controlling the intermittent movements of said cutter.

12. A hay baler, comprising a compression frame, a reciprocating plunger for compressing hay within said frame, a transversely movable rotatable cutter which by its movement severs rearwardly projecting wisps of hay from a completed bale, mechanism for reciprocating said plunger, mechanism intermittently operated by said plunger-operating mechanism for producing transverse movements of said rotatable cutter, and means controlled by the movement of the compressed hay in the compression frame for controlling the intermittent movements of said cutter.

In witness whereof, I have hereunto set my hand at Greensburg, Indiana, this 31st day of May, A. D. one thousand nine hundred and seventeen.

JOHN E. ROBBINS.

Copies of this patent may be obtained for five cents each, by addressing the "Commissioner of Patents, Washington, D. C."